Patented June 17, 1947

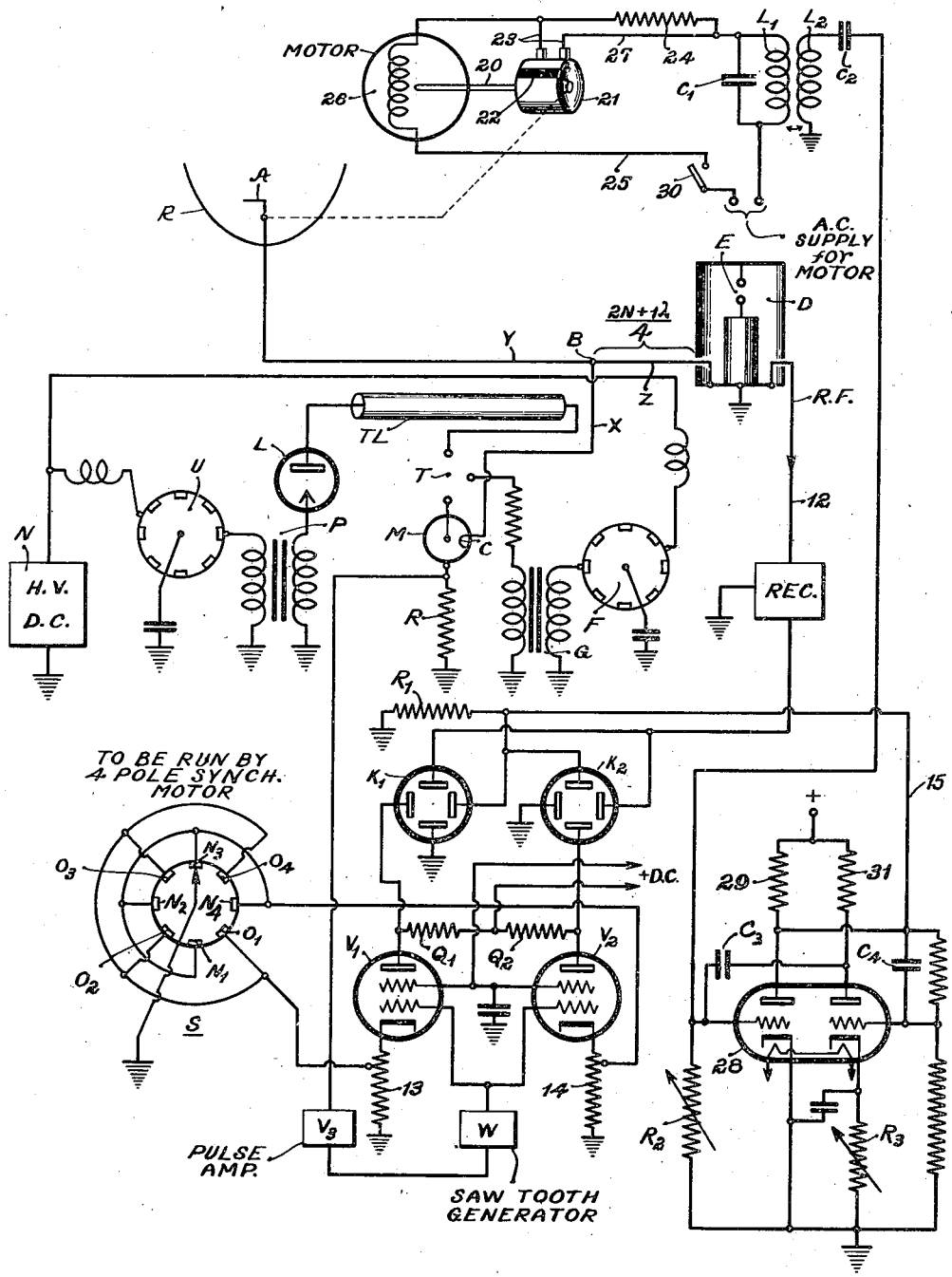

2,422,361

UNITED STATES PATENT OFFICE 2,422,361

ELECTRONIC INDICATOR SYSTEM

William A. Miller, Port Jefferson Station, N. Y., assignor to Radio Corporation of America, a corporation of Delaware Application January 28, 1943, Serial No. 473,801

18 Claims. (Cl. 250—11)

This invention relates in general to a method of and apparatus for indicating on an oscilloscope a particular beam position of an antenna which assumes a plurality of different positions periodically.

An object of this invention is to provide an electronic indication or identification of the received or echo signals when lobe switching circuits (sometimes called conical scanning) are used in obstacle detection systems of the pulse transmission type.

In obstacle detection systems, sometimes known as radio locators, it has been proposed to cause a small deflection of a radio beam at regular intervals through the four quadrants of a circle which is perpendicularly located to the mean axis of the beam, and to transmit a pulse during each quadrant. This can be done either by wiggling the whole antenna system, or (for example, in the case of an antenna utilizing a parabolic reflector with a radiating element positioned slightly off-center, eccentrically, so to speak) by spinning the radiating element in a circle, or by spinning a deflecting element off the focus of the reflector. Such an antenna system, when employed for radio locating purposes, must not only be able to produce the beam deflections at regular intervals, but must be freely movable in all directions for scanning purposes and for pointing the antenna directly on the object to be detected. A suitable antenna of the foregoing type has been designed by Philip S. Carter and described in copending application Serial No. 462,251, filed October 16, 1942.

Reference is made to the copending application of Nils E. Lindenblad, Serial No. 454,661, filed August 13, 1942, for a detailed description of the type of system to which the present invention is applicable. In this copending Lindenblad application, there is described a method of indicating on an oscilloscope a mark characteristic of a particular beam position of the antenna system. A disadvantage in Lindenblad's system is that it requires an extra lead to the motor driving the antenna, in addition to the power supply leads for the motor. This motor is located close to the antenna and usually at some distance from the power supply system. The present invention is an improvement on the Lindenblad system and provides an electronic indication which eliminates the need for an extra lead to the motor. The system of the present invention utilizes a minimum of leads, and makes use of the motor current supply leads themselves for identifying the different beam firing positions of the antenna.

The following is a detailed description of the invention accompanied by a drawing, wherein the single figure illustrates the invention used in connection with a pulse type radio locating system.

Before proceeding with a description of the invention, it is believed helpful to refer to the type of radio locating system which is illustrated in the drawing. The radio locating system is generally of the type described in Lindenblad copending application Serial No. 441,311, filed May 1, 1942, which employs a transmitter for transmitting periodically repeated radio wave pulses of extremely short duration. A receiver is used to receive the pulses which are reflected by the object to be detected. This system employs a directive antenna and other expedients at both transmitter and receiver by means of which the indications are confined to objects lying within a narrow range of angles. In order to produce the radio wave pulses, the oscillator of the transmitter is excited periodically through a spark gap switching device which is in series with the oscillator and the charging voltage source and to which is supplied at periodic intervals a voltage of sufficient value to break down the gap. The copending application of Clarence W. Hansell, Serial No. 427,266, filed January 19, 1942, also describes, generally, the principles of the radio locating system to which the present invention can be applied.

The transmitting antenna of the pulse type radio locating systems described above preferably comprises a parabolic antenna having, off-center, an eccentrically positioned radiating element which is rotated by a two-pole synchronous motor at about sixty times per second. The entire system is designed to radiate a pulse of ultra high frequency energy in each of the four quadrants of the circle traveled by the radiating element in each revolution. At a speed of rotation of sixty times per second, the pulses will be radiated 240 times per second, corresponding to a pulse for each quadrant position of each revolution of the antenna. The up and down beam firing positions of the radiating element determine the vertical position of the object to be detected, while the right and left beam firing positions of the radiating element determine the horizontal position. The radiation patterns or ears of the beam will, of course, be different for different quadrants of the circle as the radiating element rotates. The antenna system is so designed that the ears of the radiation patterns overlap in the up and down beam firing positions and also overlap in the right and left beam firing positions. Since the time interval between radiated pulses is quite long compared to the time of each pulse, it will be understood that a pulse reflected by a remote object to be detected will be received at the receiver located adjacent the transmitter during the same quadrant of rotation in which the original pulse is radiated. As an illustration, the pulse radiated during each quadrant position of each revolution of the antenna may have a duration of only one microsecond or so.

If the pulses which are reflected from a remote object were originally radiated in the up and down positions of the rotating radiating element, they will be received during the same up and down positions, and if these received pulses are of equal intensity, it follows that the horizontal plane of the antenna system is pointed at the object. If the reflected pulses received during the right and left positions of the rotating radiating element are also of equal intensity, it follows that the vertical plane of the antenna system is also pointed at the object. Under these conditions, the object to be detected is in a direct line with the focus of the antenna. If now, the parabolic reflector of the antenna is made of widely spaced wires in mesh formation, and the object is within visual distance, the illumination of a searchlight placed directly behind the reflector will illuminate the object.

If the received pulses reflected from the object are of unequal intensity, it is an indication that the antenna system is not pointed directly at the object, but to one side of the object.

The reflected pulses which are received are viewed on a pair of cathode ray oscilloscopes, one of which indicates the pulses received during the up and down positions of the rotating radiating element, and the other of which indicates the pulses received during the right and left positions of the rotating radiating element.

Inasmuch as a two pole synchronous motor is employed to rotate the antenna system, and since this motor can start either in the up or down position of the radiating element, it is important to provide a determination of whether the first reflected pulse received back from the object to be detected corresponds to either the up or down position. The present invention furnishes an improved method of and apparatus for making this determination.

Referring to the drawing in more detail, there is shown a pulse transmitter comprising an ultra high frequency oscillator M (here shown by way of example as a magnetron) capable of producing oscillations of about ten centimeters wavelength. This oscillator is periodically charged with a high polarizing potential through a spark gap T (air blast type) in circuit with a line TL. The end of line TL which is furthest removed from the spark gap T is connected through a rectifier L to the secondary winding of an induction coil P whose primary winding is connected to a main charging system comprising a source of direct current N and a switching device U. This part of the system serves to convert a relatively low voltage direct current charging potential from N to periodic high voltage pulses for charging the line TL, and corresponds to Fig. 4 of Nils E. Lindenblad copending application Serial No. 441,311 supra, to which reference is made for a more detailed description of how to produce extremely short pulses of short wave carrier energy. Reference is here made to Nils E. Lindenblad United States Patent 2,275,635, showing pulse charging circuits of interest in this connection.

A trigger spark system comprising an induction coil G, an auxiliary spark gap electrode associated with spark gap T, and a switching device F insures sparking at gap T only when line TL is fully charged and between charging pulses supplied to line TL by system U. That is, the trigger spark system insures the discharge of line TL across gap T and into the magnetron M between the times that the rectifier L is passing charging pulses to the line TL. The trigger spark switch device F is like the switching device U in that when one brush is connected to a segment on the commutator, the other brush of the same switching device is on an insulating segment or portion of the same commutator, and vice versa.

The directive antenna for radiating the extremely short pulses of ultra short wave carrier energy comprises a rotatable radiating element A positioned off the center of a parabolic reflector R. This radiating element is driven by a two-pole synchronous motor appropriately labeled, at a speed of 3,600 R. P. M., corresponding to sixty revolutions per second. This motor is located quite close to the antenna. The system is so designed that during each quadrant of the circle of each revolution of the radiating element, the magnetron will deliver a pulse to the antenna over connections X and Y, as a result of which there will be 240 pulses radiated per second. Each pulse may be of the order of one microsecond duration, or so.

The receiver REC which receives the pulse reflected from the object to be detected, is connected to the radiating element of antenna system A through lead 12, concentric line resonator D, and line Z. Line Z is an odd multiple of a quarter wave long for energy of the carrier frequency generated by magnetron M.

Lead X is coupled to the magnetron oscillator at C by means of a small loop, and is connected to the junction point B of leads Y and Z. This lead is an odd multiple of a quarter wave and is matched from an impedance standpoint to lead Y extending to the antenna, for pulses outgoing from the magnetron.

When short wave carrier pulses are sent out by the magnetron over lead X, the resonator D is energized through lead Z and this causes the spark gap E in the interior of the resonator to break down, thus producing a detuning action in D. as a result of which lead Z becomes a high impedance when looked at from point B. Thus, the main portion of the energy obtained from the magnetron M travels out to the antenna to be radiated thereby, and only a small portion of the energy derived from the oscillator passes over lead Z to maintain the spark across the gap E in resonator D.

As for energy received by the antenna A, the lead X is not matched at point C since it is closed at this point. Because the lead X has an electrical length equal to an odd multiple of a quarter wave long, the impedance of lead X at point B as seen from the antenna is high. However, energy received on the antenna will energize resonator D without producing sparking at E, as a result of which the radio frequency energy in resonator D will pass to the receiver REC for subsequent utilization by the oscilloscopes $K_1$ and $K_2$. The reason why the incoming or received energy will not cause the spark gap E in the resonator to break down while the outgoing energy from the magnetron M will cause a breakdown of the gap E, is because the latter energy is far more intense than the former.

When the magnetron is caused to oscillate by virtue of the surge of current through the spark gap T, the current through the magnetron will pass through a small resistor R or reactance as a result of which a pulse is initiated which is passed through pulse amplifier $V_3$, whose output causes the saw-tooth generator W to start. This saw-tooth generator works on the first grids of vacuum tubes $V_1$ and $V_2$, thus controlling the current through the tubes. The time constants of the saw-tooth generator are adjusted for the maximum distance range to be observed, by making the time of sweep of the generator correspond to the particular distance to be checked. As an example, the particular maximum distance of the radio locating system to be observed may be twelve miles if the rotating antenna system is to be used in connection with a searchlight. On the other hand, the range of distances may be sixty miles, more or less, as desired, with the rotating antenna described above.

Vacuum tubes $V_1$ and $V_2$ are normally non-conducting on account of the cathode bias produced by resistors 13 and 14, respectively, and will pass current when the cathode bias is reduced. The reduction in cathode bias to render the tubes $V_1$ and $V_2$ conductive is obtained by means of switch S. The contact arm of switch S is connected to ground and rotates to cause engagement with segments $N_1$ to $N_4$ and $O_1$ to $O_4$. Segments $N_1$ to $N_4$, inclusive, are connected together and to a point on cathode bias resistor 14. Segments $O_1$ to $O_4$, inclusive, are also connected together and to a point on cathode bias resistor 13. It should be noted that the segments labeled $N_1$, $N_2$, $N_3$ and $N_4$ alternate with the segments labeled $O_1$, $O_2$, $O_3$ and $O_4$. The rotating switch or scope selector S may be driven by a synchronous motor having any number of poles. If, as shown in the drawing, a four-pole machine is chosen, the number of segments on the selector commutator will be eight. Alternate contacts or segments of the selector S are connected together, and each such group of four contacts control the "on" and "off" condition for the saw-tooth sweep of each of the two cathode ray oscilloscopes $K_1$ and $K_2$. Oscilloscope $K_1$ will give a horizontal sweep, while oscilloscope $K_2$ will give a vertical sweep in the particular arrangement illustrated.

When vacuum tubes $V_1$ or $V_2$ pass current, the voltage drop in resistors $Q_1$ or $Q_2$, respectively, will control certain sweep or deflection plates of the oscilloscopes $K_1$ or $K_2$, as shown.

So far, the system described above is identical with that described in Lindenblad copending application Serial No. 454,661, supra. This Lindenblad system, however, employed an arcuate metallic segment and a lead for energizing this segment from a battery 11, in order to identify the different beam positions of the antenna. This lead employed by Lindenblad is in addition to the power supply leads for the motor, all of which extend from the power supply system to the motor located close to the antenna. The present invention eliminates the need of an extra lead to a location near the motor, and utilizes the motor power supply themselves to carry locally produced signal transients which are made to be effective only in the up position and in the right position of the rotating radiating element, in order to cause the sweep starting points on the oscilloscopes $K_1$ and $K_2$ to be slightly displaced relative to the sweep starting points when the radiating element is in the down position or the left position.

In the system of the present invention, the synchronous motor carries on its shaft 20 a copper drum or disc 21. This drum is insulated from the shaft and is slotted and filled with insulating material 22 in only one place. Two brushes 23 ride on the periphery of drum 21. These brushes are mounted side-by-side so that both brushes pass over the insulating segment 22 simultaneously. Brushes 23 are arranged so that except when they are on the insulated segment, the resistor 24 is short circuited. An inductor may be used in place of resistor 24 to reduce the ohmic loss in the motor circuit if such economy is desired.

The motor is supplied with alternating current 60 cycle power over an obvious circuit which extends from one side of the power supply through a switch 30, lead 25, the winding 26 of the motor, lead 27, coil $L_1$, to the other side of the power supply. It should be noted that resistor 24 is arranged in shunt to lead 27 at all times except when the brushes are on the insulating segment. The resistor 24 is small enough in value to allow the synchronous motor to start when switch 30 is closed, should the motor at any previous time of running have stopped with the brushes on the insulating segment 22.

Due to the action of the brushes 23 switching resistor 24 in and out of the circuit, as the drum 21 revolves, transients are produced in leads 25 and 27 which appear at the parallel connected circuit elements $L_1$ and $C_1$. The values of the coil $L_1$ and condenser $C_1$ are such that their resonant frequency, say 2400 cycles per second, is very much higher than the 60 cycles per second power line frequency in order to prevent undesired operation of the trigger circuit coupled to $L_1$, $C_1$ by means of circuit $L_2$, $C_2$. The circuits $L_1$, $C_1$, $L_2$, $C_2$ are magnetically linked together and filter out the power frequency so that only the transients introduced by the drum arrangement appear at the electrodes of the trigger circuit.

The trigger circuit comprises a vacuum tube 28 which has a pair of triode electrode structures each including an anode, a control grid and a cathode. Both anodes are supplied with positive polarizing potentials through resistors 29 and 31. The tube 28 is shown as a dual triode, but any two grid-controlled vacuum tubes connected in the same way will operate satisfactorily. The grid of the first or left hand triode is coupled to the anode of the second or right hand triode through a condenser $C_3$, while the grid of the second triode is coupled to the anode of the first triode through a condenser $C_4$. A resistor $R_2$ normally biases grid of the first triode to permit anode current to flow, while a resistor $R_3$ biases the grid of the second triode to anode current cut-off. Thus, normally, the first or left hand triode is conducting, while the second triode is non-conducting. The flow of current in the first structure produces a lowering of the anode potential thereof due to the IR drop in resistor 29.

The application of a negative pulse to the grid of the first triode, due to a transient in leads 25, 27, will so bias this grid as to cause the flow of anode current in this structure to cease, as a result of which the voltage will rise at the anode of the first triode. It should be noted that only the negative part of the transient will affect the trigger circuit in the form described. The sudden increase in potential on the anode of the first triode will cause a positive pulse to be applied through condenser C4 to the grid of the second triode structure. This positive pulse will trigger the circuit to cause the second triode to become conducting and the first triode to cease conducting. When the second triode starts conducting, there will be an IR drop in resistor 31 as a result of which a negative pulse will be applied to condenser C3 and the grid of the first triode. The time constants of condenser C3 and R2 determine how long the first triode will remain non-conducting and the second triode conducting. When the negative charge on condenser C3 leaks off through resistor R2 the trigger circuit will be restored to normal, in which condition the first triode will be conducting and the second triode non-conducting.

It should be noted that the anode of the first triode is also connected to lead 15 extending to the cathode ray oscilloscopes K1 and K2. Thus, the trigger circuit functions to deliver a pulse to the oscilloscope. The duration of this pulse is adjusted to be equal to or slightly greater than three-eighths of the time for one revolution of the motor, by varying the grid leak resistor R2.

The sensitivity of the trigger circuit is changed until the circuit is operative only because of the transient produced by the action of drum 21, by varying the resistor R3.

In the operation of the system as a whole, let us assume that the trigger circuit is in the condition where a pulse slightly greater than three-eighths of the time for one revolution is being applied to the oscilloscopes. The spark gap T will break down in the quadrant corresponding to the time of occurrence of this pulse (gap T breaks down once in each quadrant in each revolution of the radiating element), as a result of which a pulse from the magnetron will pass out to the radiating element. This same pulse will produce a high impedance at point B looking toward the receiver REC, thus blocking the receiver solely for the duration of the outgoing pulse. At this same time, a portion of the pulse from the magnetron will pass through amplifier V3 which will cause the start of the saw-tooth generator W. Tube V2 will be conductive because of the decrease in its cathode bias, assuming the rotating contact arm of switch S to be at this particular moment on one of the N segments. The output of the saw-tooth generator through tube V2 will now produce a vertical sweep of the cathode ray in oscilloscope K2. At a later moment when the rotating arm of switch S is on one of the O segments, the tube V1 will become conductive to produce a horizontal sweep of the cathode ray in oscilloscope K1. It should be noted that the anode of tube V2 is connected to the lower vertical deflection plate of scope K2, while the anode of tube V1 is connected to the left horizontal deflection plate of scope K1. This vertical sweep is scaled according to the range of distances to be observed from the antenna to the object to be detected. A reflected wave (sometimes called an echo) returned from the object to be detected will pass through the receiver REC and cause a horizontal deflection on oscilloscope K2 by means of the right hand deflection plate of K2 in circuit with the video output of the receiver. (It should be understood that the receiver is now in condition to receive because the outgoing pulse which blocks the receiver is extremely short compared to the time interval between successive outgoing pulses.) This horizontal deflection will be some distance down on the vertical sweep of K2, depending on the time for the original transmitted pulse to be returned to the antenna. The extent of horizontal deviation of the sweep is a measure of the intensity of the returned (reflected) pulse. The vertical sweep in scope K2 will continue during the horizontal deflection produced by the returned pulse and gives width to the observed pulse.

The pulse from the trigger circuit tube 28 is connected across the grounding resistor R1, by virtue of connection 15. Thus, resistor R1 is in circuit with one vertical plate of oscilloscope K2 and one horizontal plate of oscilloscope K1. This bias changes the location of the origin of the ray spot (sweep starting point) on the oscilloscope, so that the operator, knowing the direction of displacement produced by the trigger circuit, can determine when the antenna radiating element is in the particular up position corresponding to the quadrant at which the bias is effective. Horizontally observed deflections on the vertical sweep oscilloscope K2 caused by reflected pulses received during the time the antenna is in the up position will thus be displaced vertically from the deflections on the same scope K2 caused by the reflected pulses received during the time the antenna is in the down position.

Inasmuch as the pulse from the trigger circuit is preferably slightly longer than 90°, it is effective for the up vertical position of the antenna and also for the right horizontal position of the antenna. Consequently, echo or reflected pulses passed on by the receiver REC to the oscilloscope K1 while the antenna is in the right and left horizontal positions will produce vertical deflections on the horizontal sweep of the oscilloscope K1, but the bias from the pulse delivered by the trigger circuit will change the location of the origin of the ray spot (sweep starting point) in K1, so that the operator can determine when the antenna is in the particular right horizontal position.

The horizontal deflections on the vertical sweep scope K2 due to received echo pulses passed on during the up and down positions of the antenna will appear one above the other, and similarly, the vertical deflections on the horizontal sweep scope K1 due to received pulses passed on during the right and left positions of the antenna will appear adjacent each other. Due to the speed of rotation of the antenna through its four quadrants and the rapidity of the radiated pulses, the deflections appearing on the oscilloscopes will appear stationary on account of the persistence of vision.

An advantage of the present invention lies in the fact that the operator can always determine immediately which deflections on the oscilloscopes correspond to the different positions of the spinning antenna, despite the fact that the synchronous two-pole motor driving the antenna can lock in synchronism at either of two positions displaced 180° with respect to each other.

It should be understood that an adjustment of the timing circuit C3, R2, 31 of the trigger system 28 allows the use of any mechanically attainable speed of the motor 26, and still permits synchronism of operation.

What is claimed is:

1. A rotating antenna system having means for causing the pattern thereof to assume different positions of effectiveness, and electronic means including an electron discharge device trigger circuit effective for a duration not less than one-quarter of the time of one rotation of said system for indicating in positive manner at least one of the different positions of said system.

2. An antenna moving in an orbit and sequentially assuming different positions of effectiveness, an electronic indicating system, and an electronic trigger circuit operative during only a part of the time of one period of motion of said antenna for producing on said indicating system an electronic indication characteristic of certain positions of said antenna.

3. A rotating antenna, and an electron discharge device trigger circuit operative only during the passage of said antenna over two adjacent quadrants of the circle which it traverses for producing an indication characteristic of the particular position of said antenna.

4. A directive antenna system comprising a reflector and a radiating element eccentrically positioned in front of said reflector, a motor having a shaft linked to said radiating element for rotating the same to produce continually changing beam positions, a cathode ray tube system, and an electron discharge device trigger circuit rendered operative during only a part of the path of travel of said radiating element and coupled to said cathode ray system for producing an indication characteristic of a certain position of said radiating element.

5. A conical scanning antenna system comprising a single radiating structure whose pattern assumes sequentially different overlapping lobe patterns, a cathode ray tube system, and an electron discharge device trigger circuit whose output is coupled to cathode ray system for indicating the different lobe positions of said antenna.

6. A directive antenna system comprising a parabolic reflector and a radiating element positioned off-center in front of said reflector, a motor driving said element in a circle about the axis of said reflector, a pair of cathode ray tubes one for indicating the vertical positions of said radiating element, and the other for indicating the horizontal positions of said radiating element, and a trigger circuit in the form of a pair of interconnected electron discharge device electrode structures coupled to said cathode ray tubes and supplying a bias to said tubes in only one vertical position and in only one horizontal position of said radiating element for producing indications characteristic of these positions of said radiating element.

7. A directive antenna having a two-pole synchronous driving motor for causing said antenna to assume sequentially four different beam firing positions corresponding to the four quadrants of a circle, first and second cathode ray tubes, an electronic trigger circuit effectively operative solely during two adjacent quadrants of the circular path travelled by said antenna, and a circuit connection from said trigger circuit to different deflection plates of said cathode tubes, whereby said tubes provide indications characteristic of the positions of said antenna in all four quadrants.

8. The combination with a directive antenna system including a reflector, a radiating element positioned in front of said antenna, and means including a motor for causing said directive antenna system to sequentially assume different beam firing positions, of a pulse transmitter coupled to said antenna for passing a pulse of energy to said antenna for each different beam firing position assumed by said antenna, and means including an electron discharge device trigger circuit and a cathode ray tube for identifying electrically at least one of said beam positions.

9. A combination as defined in claim 8, characterized in this that said means for identifying the position of at least one of said beam positions includes a radio receiver for receiving a pulse reflected back from a remote object to be detected, and a circuit for blocking said receiver during the intervals in which pulses of energy are transmitted by said transmitter, said cathode ray tube being coupled to the output of said receiver.

10. The combination with a directive antenna system including a reflector, a radiating element positioned in front of said antenna, and means including a multi-pole synchronous motor for causing said directive antenna system to sequentially assume different beam firing positions, of a pulse transmitter coupled to said antenna for passing a pulse of energy to said antenna for each different beam firing position assumed by said antenna, and means including an electron discharge device trigger circuit and a cathode ray oscilloscope for identifying electrically at least one of said beam positions.

11. In combination, a motor having a driving coil, a drive shaft for said motor, a drum driven by said drive shaft, a pair of connections from the terminals of said driving coil to a low frequency alternating current power source, one of said connections having therein a resistor of small value, circuit means responsive to movement of said drum for periodically short-circuiting said resistor only once during each rotation of said drum and for a small period of time compared to the time of each rotation of said drum, as a result of which transients are developed in said pair of connections, an electron discharge device trigger circuit responsive to said transients, a filter coupled between said trigger circuit and said pair of connections for preventing energy having the frequency of said alternating current power source from affecting said trigger circuit, and indicator means coupled to the output of said trigger circuit.

12. In combination, a motor having a driving coil, a drive shaft for said motor, a drum driven by said drive shaft, a pair of connections from the terminals of said driving coil to a low frequency alternating current power source, one of said connections having therein a resistor of small value, circuit means responsive to movement of said drum for periodically short-circuiting said resistor only once during each rotation of said drum and for a small period of time compared to the time of each rotation of said drum, as a result of which transients are developed in said pair of connections, an electron discharge device trigger circuit resposive to said transients, a filter coupled between said trigger circuit and said pair of connections for preventing energy having the frequency of said alternating current power source from affecting said trigger circuit, and a cathode ray tube circuit coupled to the output of said trigger circuit.

13. In combination, a motor having a driving coil, a drive shaft for said motor, a drum driven by said drive shaft, a pair of connections from the terminals of said driving coil to a low frequency alternating current power source, one of said connections having therein a resistor of small value, circuit means responsive to movement of said drum for periodically short-circuiting said resistor only once during each rotation of said drum and for a small period of time compared to the time of each rotation of said drum, as a result of which transients are developed in said pair of connections, an electron discharge device trigger circuit responsive to said transients, said trigger circuit having impedance means so adjusted as to cause said trigger circuit to be responsive to said transients for a duration not substantially longer than the time of one-quarter of one revolution of said motor, a filter coupled between said trigger circuit and said pair of connections for preventing energy having the frequency of said alternating current power source from affecting said trigger circuit, and indicator means coupled to the output of said trigger circuit.

14. In combination, a motor having a driving coil, a drive shaft for said motor, a drum driven by said drive shaft, a pair of connections from the terminals of said driving coil to a low frequency alternating current power source, one of said connections having therein an impedance, circuit means responsive to movement of said drum for periodically short-circuiting said impedance only once during each rotation of said drum and for a small period of time compared to the time of each rotation of said drum, as a result of which transients are developed in said pair of connections, an electron discharge device trigger circuit responsive to said transients, a filter coupled between said trigger circuit and said pair of connections for preventing energy having the frequency of said alternating current power source from affecting said trigger circuit, and indicator means coupled to the output of said trigger circuit.

15. A switch for producing momentary voltage transients comprising a motor having a winding, a metallic drum having a slot on its periphery for accommodating a segment of insulating material, means for driving said drum from said motor, a pair of connections from the terminals of said winding to a source of alternating current, one of said connections having therein an impedance element capable of passing direct current therethrough, a pair of brushes arranged substantially side by side on the periphery of said drum, a connection from one terminal of said impedance element to one brush and a connection from the other terminal of said impedance element to the other brush, whereby said impedance element is periodically short-circuited as said drum rotates, and transients are developed in said first pair of connections.

16. A switch for producing momentary voltage transients comprising a motor having a winding, a drum of one kind of material having a slot on its periphery for accommodating a segment of another kind of material, one of said materials being insulation while the other is metal, means for driving said drum from said motor, a pair of connections from the terminals of said winding to a source of alternating current, one of said connections having therein an impedance element capable of passing direct current therethrough, a pair of brushes arranged substantially side by side on the periphery of said drum, a connection from one terminal of said impedance element to one brush and a connection from the other terminal of said impedance element to the other brush, whereby said impedance element is periodically short-circuited as said drum rotates, and transients are developed in said first pair of connections.

17. A receiving and indicating system for radio waves comprising a directive antenna, means for causing the direction of the antenna pattern to sequentially and periodically assume different positions of effectiveness corresponding to lobes which would intersect if they were produced simultaneously, and means including an electron discharge device trigger circuit effective for a duration not less than one-quarter of the time of one rotation of said system for indicating in positive manner at least one of the different positions of said system.

18. An obstacle detection system comprising a transmitter for periodically sending short wave carrier pulses of short duration spaced in time an amount which is compared to the time of each pulse, a directive antenna system for said transmitter including a parabolic reflector having a radiating element positioned off-center, a two-pole synchronous motor for rotating said radiating element in a circular path, whereby the pattern of said antenna system periodically assumes a plurality of beam positions, said motor having a driving coil, a drive shaft for said motor, a drum driven by said drive shaft, a pair of connections from the terminals of said driving coil to a low frequency alternating current power source, one of said connections having therein a resistor of small value, circuit means responsive to movement of said drum for periodically short-circuiting said resistor only once during each rotation of said drum and for a small period of time, compared to the time of each rotation of said drum, as a result of which transients are developed in said pair of connections, an electron discharge device trigger circuit responsive to said transients, a filter coupled between said trigger circuit and said pair of connections for preventing energy having the frequency of said alternating current power source from affecting said trigger circuit, and a cathode ray tube circuit coupled to the output of said trigger circuit.

WILLIAM A. MILLER.

REFERENCES CITED

The following references are of record in the file of this patent:

UNITED STATES PATENTS

| Number | Name | Date |
| --- | --- | --- |
| 2,185,059 | Kear et al | Dec. 26, 1939 |
| 2,189,549 | Hershberger | Feb. 6, 1940 |
| 2,263,377 | Busignies et al | Nov. 18, 1941 |